United States Patent [19]

Frase

[11] Patent Number: 4,766,962
[45] Date of Patent: Aug. 30, 1988

[54] FURROW FORMING APPARATUS FOR ATTACHMENT TO A TOOL BAR

[75] Inventor: Roland J. Frase, Roselle, Ill.

[73] Assignee: J. I. Case Company, Racine, Wis.

[21] Appl. No.: 923,280

[22] Filed: Oct. 27, 1986

[51] Int. Cl.$^4$ .............................................. A01B 39/22
[52] U.S. Cl. .................. 172/624.5; 74/89.17; 74/411.5; 74/422; 74/530; 172/736
[58] Field of Search ............ 172/307, 427, 624, 624.5, 172/661, 734, 736; 248/585, 586; 254/95, 97; 74/89.17, 411.5, 422, 530

[56] References Cited

U.S. PATENT DOCUMENTS

| | | | |
|---|---|---|---|
| 812,216 | 2/1906 | Lorimer | 74/530 |
| 1,080,280 | 12/1913 | Hult | 74/422 |
| 1,305,200 | 5/1919 | De Vaul | 74/89.17 |
| 2,605,950 | 8/1952 | Colvin | 74/422 X |
| 2,933,290 | 4/1960 | Ryder, Jr. | 254/95 X |
| 3,621,731 | 11/1971 | Houss | 74/411.5 |
| 4,423,788 | 1/1984 | Robinson, Jr. et al. | 172/624.5 X |
| 4,461,355 | 7/1984 | Peterson et al. | 172/624.5 X |
| 4,530,406 | 7/1985 | Hake et al. | 172/705 |
| 4,560,132 | 12/1985 | Wilder | 74/422 X |

FOREIGN PATENT DOCUMENTS

| | | | |
|---|---|---|---|
| 255816 | 7/1967 | Australia | 172/307 |
| 155692 | 9/1985 | European Pat. Off. | 172/624.5 |
| 1336902 | 7/1963 | France | 74/422 |

Primary Examiner—Richard T. Stouffer
Attorney, Agent, or Firm—Dressler, Goldsmith, Shore, Sutker & Milnamow, Ltd.

[57] ABSTRACT

A furrow forming apparatus for a seed planter is disclosed wherein the construction facilitates convenient adjustment of spring-biasing exerted on furrow forming disks of the assembly. The apparatus includes a parallel linkage which permits relative vertical movement of the disks. Springs operatively associated with the linkage are positionable for creating either downward or upward pressure on the disks. Adjustment of the springs is accommodated by the provision of an upper support rod which receives upper ends of the springs, with the support rod selectively positionable along upper links of the parallel linkage by the provision of an adjustable rack and pinion mounting arrangement.

8 Claims, 2 Drawing Sheets

FURROW FORMING APPARATUS FOR ATTACHMENT TO A TOOL BAR

TECHNICAL FIELD

This invention pertains generally to agricultural equipment and, more specifically, to a furrow forming apparatus for a seed planter or similar implement having a unique arrangement to vary the downward or upward pressure applied by a parallel support linkage of the apparatus.

BACKGROUND OF THE INVENTION

The efficient production of crops requires that seed planters meet certain primary design objectives which are: creating a furrow having an accurate planting depth and preferably providing soil having a reasonably high moisture content for early germination; accurate seed spacing; and seed to soil contact. This invention is primarily concerned with the furrow forming aspect of a planter.

A known seed planter utilizes a conventional pair of rotatably mounted, generally flat, disk openers that substantially contact each other where the disks enter the ground and diverge apart rearwardly and upwardly. The disks are supported on a frame which is connected to a tool bar of a mobile power source by a parallel support (i.e., parallelogram) linkage so that the frame is maintained in a generally horizontal position parallel to the ground despite varying ground contours. A downpressure spring arrangement extends between the upper and lower links of the parallel linkage to apply varying amounts of up or down pressure to the linkage and thereby decrease or increase the force applied to the disks to insure that they properly penetrate the soil. The springs, depending on their relative lever arms on the upper and lower links of the linkage, can apply varying amounts of up as well as down pressure.

It has heretofore been the usual practice to provide a pair of spaced apart down-pressure springs having lower ends received by a tube rigidly secured to the lower links, and upper ends received by a channel attached between the upper links. The upper links are provided with longitudinally spaced openings formed therein, and the channel can be selectively positioned along the length of the links by the use of bolts extending through the link openings and which are received by the ends of the channel. In order to reposition the down pressure springs and thereby adjust the up or down pressure of the support linkage, it is necessary to remove the bolts from each end of the channel, reposition the channel adjacent the selected link openings and then re-install the bolts. This is a time-consuming job and many times an operator will neglect to do it on a multi-row planter. This may result in poor performance of the planter.

The present invention solves this problem by providing an arrangement which permits quick and easy adjustment of the aforementioned pressure.

SUMMARY OF THE INVENTION

The furrow forming apparatus in accordance with the present invention includes a frame adapted to be attached to a tool bar of a mobile power source with a furrow forming means rotatably mounted on the frame. The frame is mounted to the tool bar by a parallel linkage with an adjusting mechanism provided which facilitates selective adjustment of the downward or upward pressure applied to the furrow forming means.

The parallel linkage includes a pair of transversely spaced, longitudinally extending upper links pivotably secured at first ends generally at the tool bar and at second ends to the frame, and a pair of transversely spaced, longitudinally extending lower links pivotably secured at first ends at the tool bar and at second ends to the frame. An upper support rod transversely extends between the upper links and a lower support member transversely extends between the lower links. A down pressure spring means extends between the upper support rod and the lower support member to spring load the parallel linkage.

The upper support rod has first and second ends which are received and selectively moveable in longitudinally extending slots associated with each of the upper links for selectively adjusting the downward or upward pressure applied to the furrow forming means. The slots may alternatively be formed in the upper links themselves, or may be formed in plate members secured to the upper links.

In order to facilitate the selective positioning of the upper support rod in the slots, the first and second ends are provided with pinion gear teeth formed therein, and the slots are formed with rack teeth formed therein. The pinion teeth are received by the rack teeth such that rotation of the upper support rod causes longitudinal movement thereof in the slots, thus altering the position of the down pressure spring means relative to the upper links.

Retaining means are provided for selectively retaining the upper support rod in a fixed location along the length of the slots. The retaining means preferably includes a sleeve member received about the upper support rod and which is moveable between a first position spaced from an associated one of the slots, and a second position extending into the slot. The sleeve member has a pair of spaced apart projections formed at an outer end thereof which are received by and interengaged with the rack teeth when the sleeve member is in its second position, so as to preclude rotation of the upper support rod and thereby retain the rod in a selected location. The sleeve member is spring biased towards its second position by a spring means received about the upper rod member and extending between the inner end of the sleeve member and a guide washer secured to the upper rod member.

The lower support member may be provided with a pair of longitudinally spaced openings formed therein for selective receipt of the lower end of the down pressure spring means. A pair of spaced apart down pressure spring means is preferably provided between spaced locations on the upper support rod and the lower support member. The down pressure spring means may include means to selectively adjust the pressure thereof.

Other features and advantages of the present invention will become readily apparent from the following detailed description, the accompanying drawings, and the appended claims.

DESCRIPTION OF A PREFERRED EMBODIMENT

Figure 1:
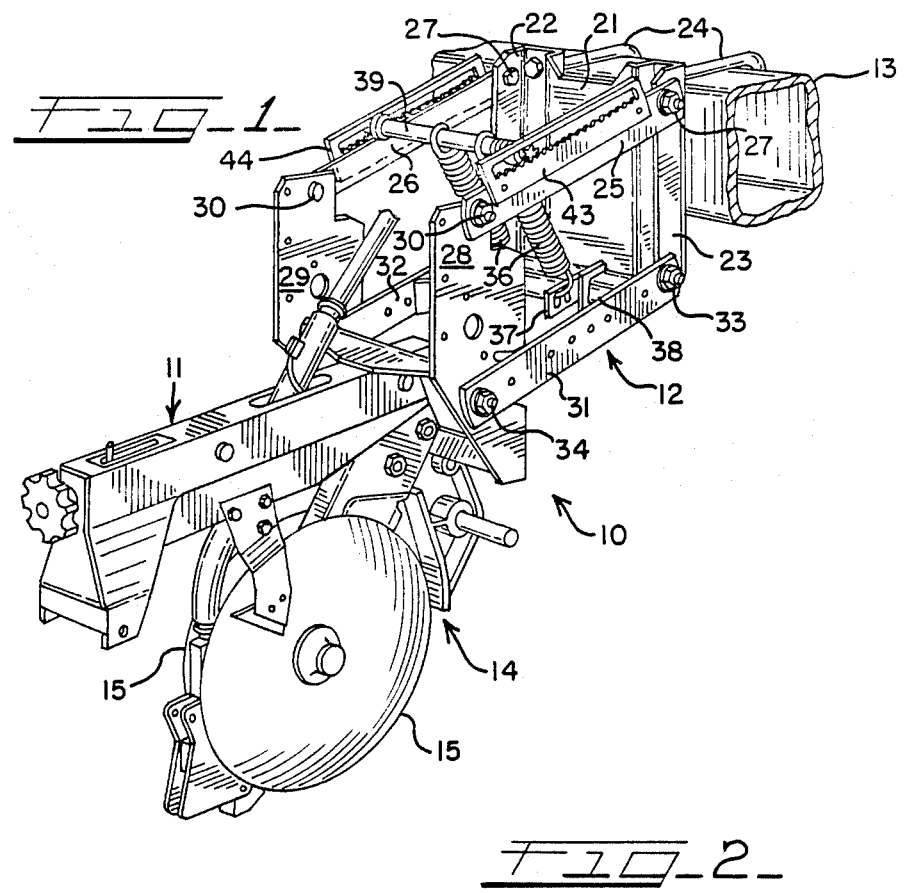
FIG. 1 is a fragmentary, perspective right side view of a seed planter implement incorporating the furrow forming apparatus in accordance with the present invention.

While the present invention is susceptible of embodiment in various forms, there is shown in the drawings and will hereinafter be described a presently preferred embodiment, with the understanding that the present disclosure is to be considered an exemplification of the invention, and is not intended to limit the invention to the specific embodiment illustrated.

Referring to FIG. 1, a furrow forming apparatus for a seed planter is indicated by the reference numeral 10. Apparatus 10 has a frame 11 and a mounting arrangement 12 for attachment of the frame to a mobile power source, such as a tool bar 13 of a tractor, for towing.

As is well known in the art, the furrow forming apparatus includes a furrow forming arrangement generally designated 14 supported from frame 11. The furrow forming arrangement 14 includes a pair of rotatably mounted furrow forming disks 15 that substantially contact each other where they enter the ground and diverge apart rearwardly and upwardly. Gauge wheels (not shown) are ordinarily pivotally supported on the frame 11 rearward of the disks. An exemplary furrow forming arrangment is illustrated and disclosed in U.S. Pat. No. 4,356,780, which patent is assigned to the same assignee as the present invention.

The present invention is specifically directed to an improved construction of the mounting arrangement 12 to facilitate selective adjustment of the downward or upward pressure exerted on the furrow forming arrangement 11, and thereby decrease or increase the force applied to the disks 15 to insure that they properly penetrate the soil.

Referring to FIGS. 1-4, the mounting arrangement 12 includes a head bracket 21 having lateral flanges 22 and 23. Bracket 21 has suitable holes for connection thereof to the tool bar 13 by U-bolts 24. A pair of transversely spaced, longitudinally extending upper links 25 and 26 are pivotally connected at their first, forward ends to upper portions of flanges 22 and 23 by suitable pivot fasteners 27. The second, rearward ends of upper links 25 and 26 are pivotally connected to upper portions of a pair of transversely spaced brackets 28 and 29 by suitable pivot fasteners 30. Brackets 28 and 29 are rigidly secured to frame 11.

A pair of transversely spaced, longitudinally extending lower links 31 and 32 are pivotally connected at their first forward ends to lower portions of the flanges 22 and 23 by suitable pivot fasteners 33, and at their second, rearward ends to lower portions of brackets 28 and 29 by suitable pivot fasteners 34. The above described conventional parallel or parallelogram linkage arrangement allows the furrow forming apparatus to follow the ground contour in operation.

A pair of transversely spaced down pressure springs 36, preferably comprising tension coil springs, provide the necessary bias to the furrow forming apparatus to provide the required force to the disks 15 to properly penetrate the soil. The springs 36 respectively extend between corresponding brackets 37 (one shown), secured to a lower support channel member 38 rigidly connected between lower links 31 and 32, and an upper support cylindrical rod 39 extending between upper links 25 and 26. The brackets 37 extend in a longitudinal direction, and are provided with a pair of longitudinally spaced openings 40 and 42 (see FIG. 2). The lower portions of springs 36 have hooked ends which are received in selected ones of openings 40 or 42; typically, the more forward openings 42 are employed for creating down-pressure, while the rearward openings 40 are used for creating up-pressure. The upper ends of springs 36 likewise each have a hooked configuration, and are received about upper support rod 39.

Figure 2:
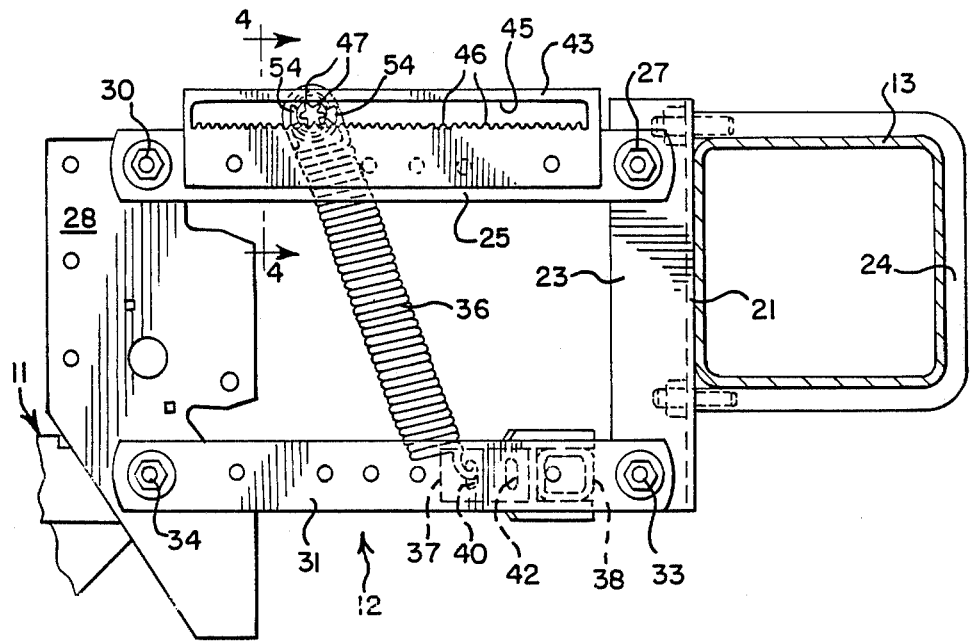
FIG. 2 is an enlarged side elevational view of a mounting means of the furrow forming apparatus for securing same to a tool bar.

In accordance with one aspect of the present invention, the respective ends of upper support rod 39 are received and selectively moveable and positionable in longitudinally extending slots associated with the upper links 25 and 26. In accordance with the illustrated embodiment of the invention, longitudinally extending rack plates 43 and 44 are respectively rigidly attached to the sides of upper links 25 and 26 and extend upwardly therefrom. As best shown in FIGS. 1 and 2, plates 43 and 44 have longitudinally extending slots 45 formed therein, with a series of rack teeth 46 formed along the length of each slot. The respective ends of upper support rod 39 are formed with pinion teeth 47 which extend into slots 45 and mesh with the rack teeth 46 such that rotational movement of support rod 39 causes longitudinal movement thereof in slots 45.

Figure 3:
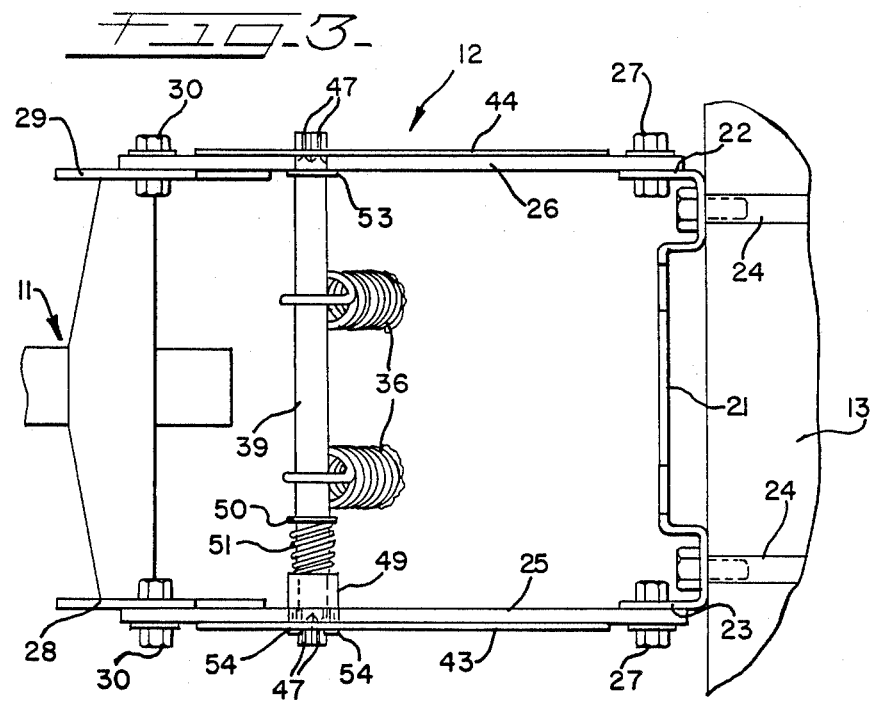
FIG. 3 is a top plan view of the mounting means as shown in FIG. 2.
Figure 4:
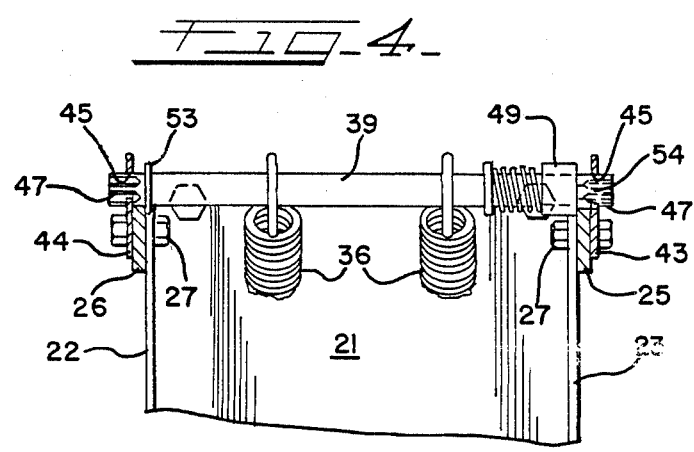
FIG. 4 is a sectional view taken along line 4—4 in FIG. 2.

Referring to FIGS. 2-4, a retaining arrangement is provided to selectively retain support rod 39 in a fixed location along the length of the slots 45. The arrangement preferably includes a sleeve member 49 which is received about one end of support rod 39. A guide washer 50 is secured to the support rod, inwardly from one end thereof, and a spring means 51 (preferably a compression coil spring) is received about the support rod and extends between the guide washer 50 and the inner end 52 of the sleeve member. An additional guide washer 53 is secured to support rod 39 adjacent to rack plate 44 and upper link 26, with the guide washers 50, 53 and sleeve member 49, thus acting to position the support rod for the desired movement relative to the rack plates 43, 44.

The outer end of the sleeve member 49 is formed with a pair of projections 54 which are spaced apart so that the associated pinion teeth 47 are positioned therebetween. Sleeve member 49 is moveable between a first retracted position wherein its outer end is spaced inwardly of the slot 45, and a second position (illustrated in the drawings) wherein the projections 54 projects into the associated slot 45. Projections 54 are shaped so as to be received by and interengage the rack teeth 46 when the sleeve member is in its second position, and thereby preclude rotation of the support rod 39 and retain same in a selected location. The spring means 51 biases the sleeve member 49 towards its second or retaining position.

It will be quite apparent from the discussion of the operation of the mounting arrangement 12 which herein follows that the present invention facilitates permits quick and easy adjustment of the up or down pressure applied by the springs 36 to the parallel linkage.

When the upper ends of the springs 36 are a greater distance from the pivot fasteners 27 in comparison to the spacing between lower ends of springs 36 and pivot fasteners 33, the parallel linkage is spring loaded downward to increase the force applied to the disks 15 to insure that they penetrate the soil. It can be appreciated that adjustment of the relative positions of the upper and lower ends of the springs is effective to increase or decrease the downward (or upward) pressure applied by the springs to the parallel linkage. That is, as the upper ends of the springs are moved forward in relationship to the lower ends of the springs, the down pressure on the disks 15 is decreased. The relative positions of the upper and lower ends of the springs is dependent upon the location of upper support rod 39 in slots 45, and the selection of the openings 40 or 42 in brackets 37 which the lower hook ends of the springs extend through.

Under normal operation for creating down pressure on the parallel linkage, the lower ends of springs 35 and 36 are positioned to extend through openings 42. The desired down pressure on the disks 15 is achieved by selecting the location of the upper support rod 39 in the slots 45. In order to move the upper support rod to its desired location, the sleeve member 49 is moved against the bias of spring 51 into its first retracted position so as to withdraw projections 54 from engagement with rack teeth 46. The support rod 39 is then rotated so that it moves in the desired direction relative to the slots 45. Notably, the manner in which pinion teeth 47 project beyond the outer surfaces of plates 43 and 44 permits rotation of the support rod to be effected by use of a conventional wrench fitted to the pinion teeth.

When the upper support rod 39 reaches its desired location, the sleeve member 49 is released so that the projections 54 are guided into interengaged, retaining relationship with the rack teeth 46. It can be appreciated that the substantial plurality of the rack teeth 46 permits the down pressure exerted on the parallel linkage by the springs 36 to be adjusted in very fine increments to achieve the desired down pressure on the disks 15.

Should it be desired to exert an up pressure on the parallel linkage by the springs 36, the lower ends of the springs are preferably positioned to extend through rearward openings 40 in brackets 37, and the upper support rod 39 is located towards the forward end of slots 45 so that the relative positions of the upper and lower ends of the springs is such that the upper ends are positioned forwardly of the lower ends.

While the present invention has been described with reference to a preferred embodiment thereof, it will be understood that all of the equivalent forms or ramifications thereof are also contemplated. For example, it is contemplated that the slots 45 may be formed directly in the upper links 25 and 26. It is also contemplated that the springs 35 and 36 may be provided with means to selectively increase or decrease the pressure exerted by the springs. Moreover, the words used herein are words of description rather than of limitation, and various changes can be made without departing from the spirit or scope of the invention disclosed herein.

What is claimed is:

1. A furrow forming apparatus for attachment to an associated tool bar of a mobile power source, comprising:
   (a) means for mounting said apparatus on said associated tool bar;
   (b) a frame, and furrow forming means mounted on said frame;
   (c) a parallel linkage including a pair of transversely spaced longitudinally extending upper links pivotally secured at first forward ends to said mounting means, and at second rearward ends to said frame, and a pair of transversely spaced longitudinally extending lower links pivotally secured at first forward ends to said mounting means, and at second rearward ends to said frame;
   (d) an upper support member transversely extending between said upper links;
   (e) a lower support member transversely extending between said lower links;
   (f) down pressure spring means having an upper end received by said upper support member and a lower end received by said lower support member for spring loading said parallel linkage;
   (g) said upper support member having first and second ends received and selectively moveable in longitudinally extending slots associated with each of said upper links for selectively adjusting the vertical pressure applied to said furrow forming means by said spring means, wherein said upper support member comprises a rod having pinion teeth formed at said first and second ends of said upper support member, and said slots have rack teeth formed therein which receive said pinion teeth such that rotation of said rod causes longitudinal movement thereof in said slots; and
   (h) retaining means for selectively retaining said rod in a fixed location along the length of said slots, said retaining means including a sleeve member received about said rod and movable between a first retracted position spaced from said slot and a second position extending into said slot, said sleeve member having at least one projection formed at an outer end thereof which is received by said rack teeth when said sleeve member is in said second position so as to preclude rotation of said rod and thereby retain said rod in a selected location relative to said slot.

2. The apparatus as defined in claim 1 wherein said sleeve member is spring biased towards said second position.

3. The apparatus as defined in claim 2 wherein said at least one projection of said sleeve member includes a pair of projections formed at the outer end thereof, said projections being spaced apart such that the respective said pinion teeth are positioned therebetween.

4. The apparatus as defined in claim 2 further including a guide washer secured to said rod and further spring means received about said rod extending between said guide washer and the inner end of said sleeve member to effect spring biasing of said sleeve member.

5. The apparatus as defined in claim 1 wherein said longitudinally extending slots are formed in rack plate members secured to said upper links.

6. A furrow forming apparatus for attachment to an associated tool bar of a mobile power source, comprising:
   (a) means for mounting said apparatus on said associated tool bar;
   (b) a frame and furrow forming means mounted on said frame;
   (c) a parallel linkage including a pair of transversely spaced longitudinally extending upper links pivotally secured at first forward ends to said mounting means, and at second rearward ends to said frame, and a pair of transversely spaced longitudinally extending lower links pivotally secured at first forward ends to said mounting means, and at second rearward ends to said frame;

(d) an upper support member transversely extending between said upper links;
(e) a lower support member transversely extending between said lower links;
(f) down pressure spring means having an upper end received by said upper support member and a lower end received by said lower support member for spring loading said parallel linkage; and
(h) down pressure adjustment means for selectively adjusting pressure exerted on said furrow forming means by said down pressure spring means, said adjustment means comprising gear pinion means provided on at least one transverse end of said upper support member, and gear rack means provided on a respective one of said upper links with said pinion means in meshing engagement therewith, said pinion means having an exposed end portion extending beyond said rack means and being selectively engageable with said rack means along the length thereof so that said upper support member is selectively longitudinally positionable to adjust the pressure exerted by said down pressure springs means,
said adjustment means further comprising retaining means operatively associated with said gear pinion means and said gear rack means for selectively retaining said pinion means in a fixed position relative to said rack means for maintaining the selected pressure of said down pressure spring means.

7. The invention as defined in claim 6 wherein said lower support member includes means defining a pair of longitudinally spaced openings therein for selective receipt of the lower end of said down pressure spring means.

8. The apparatus as defined in claim 6 wherein said down pressure spring means includes a pair of spaced apart down pressure springs which respectively extend between transversely spaced locations on said upper and lower support members.

* * * * *